(Model.)

G. B. MORTON.
GRAIN BINDER.

No. 256,357.   Patented Apr. 11, 1882.

Witnesses
Thomas H. Pease
Jno. C. MacGregor

Inventor
George B. Morton
By Coburn & Thacher
Attorneys

N. PETERS, Photo-Lithographer, Washington, D. C.

(Model.)

G. B. MORTON.
GRAIN BINDER.

No. 256,357. Patented Apr. 11, 1882.

Witnesses
Thomas H. Pease
Jno. C. MacGregor

Inventor
George B Morton
By Coburn & Thacher
Attorneys

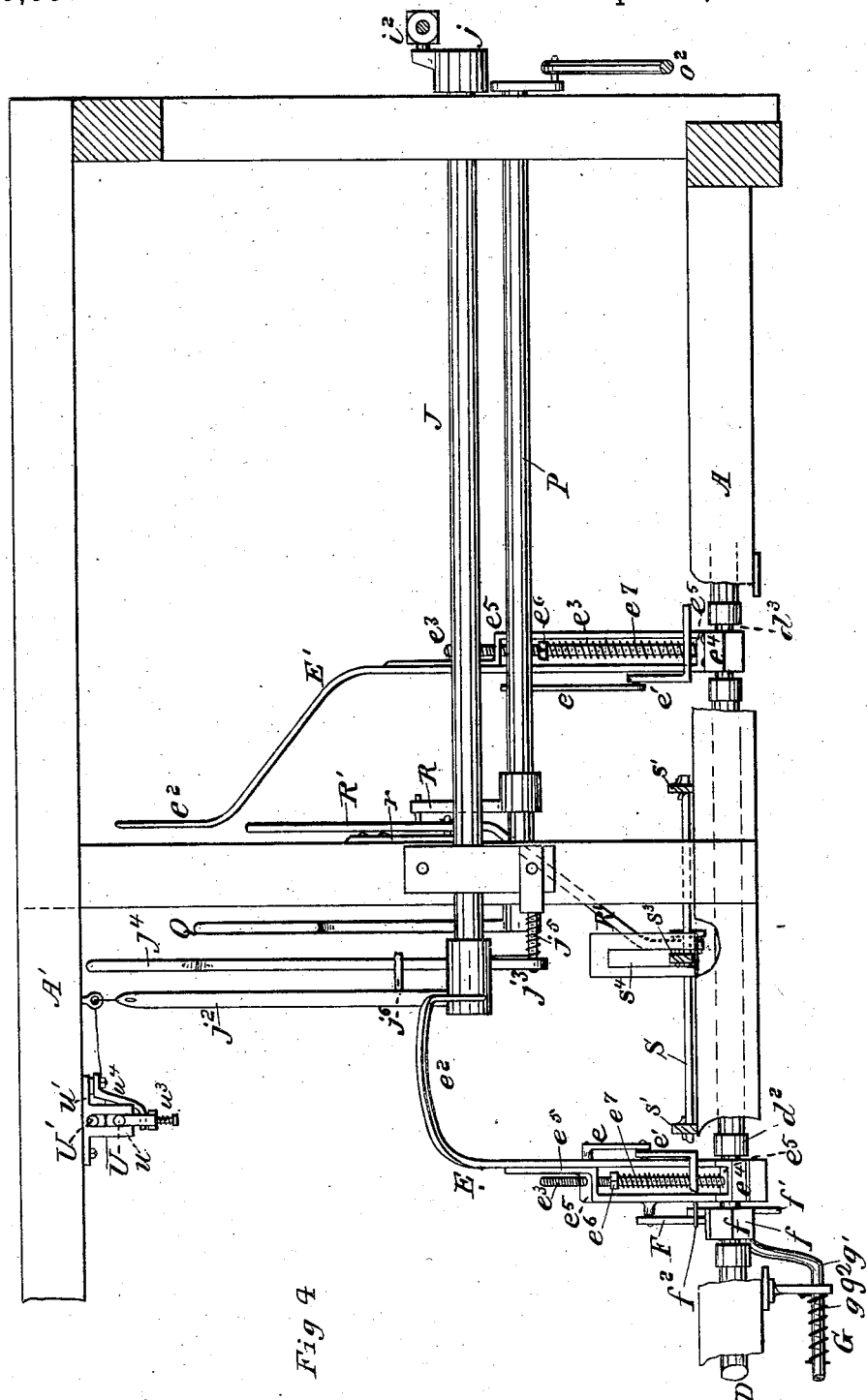

(Model.)

G. B. MORTON.
GRAIN BINDER.

No. 256,357.

5 Sheets—Sheet 4.

Patented Apr. 11, 1882.

Witnesses
Thomas H. Pease
Jno. C. MacGregor

Inventor
George B. Morton
By Coburn & Thacher
Attorneys

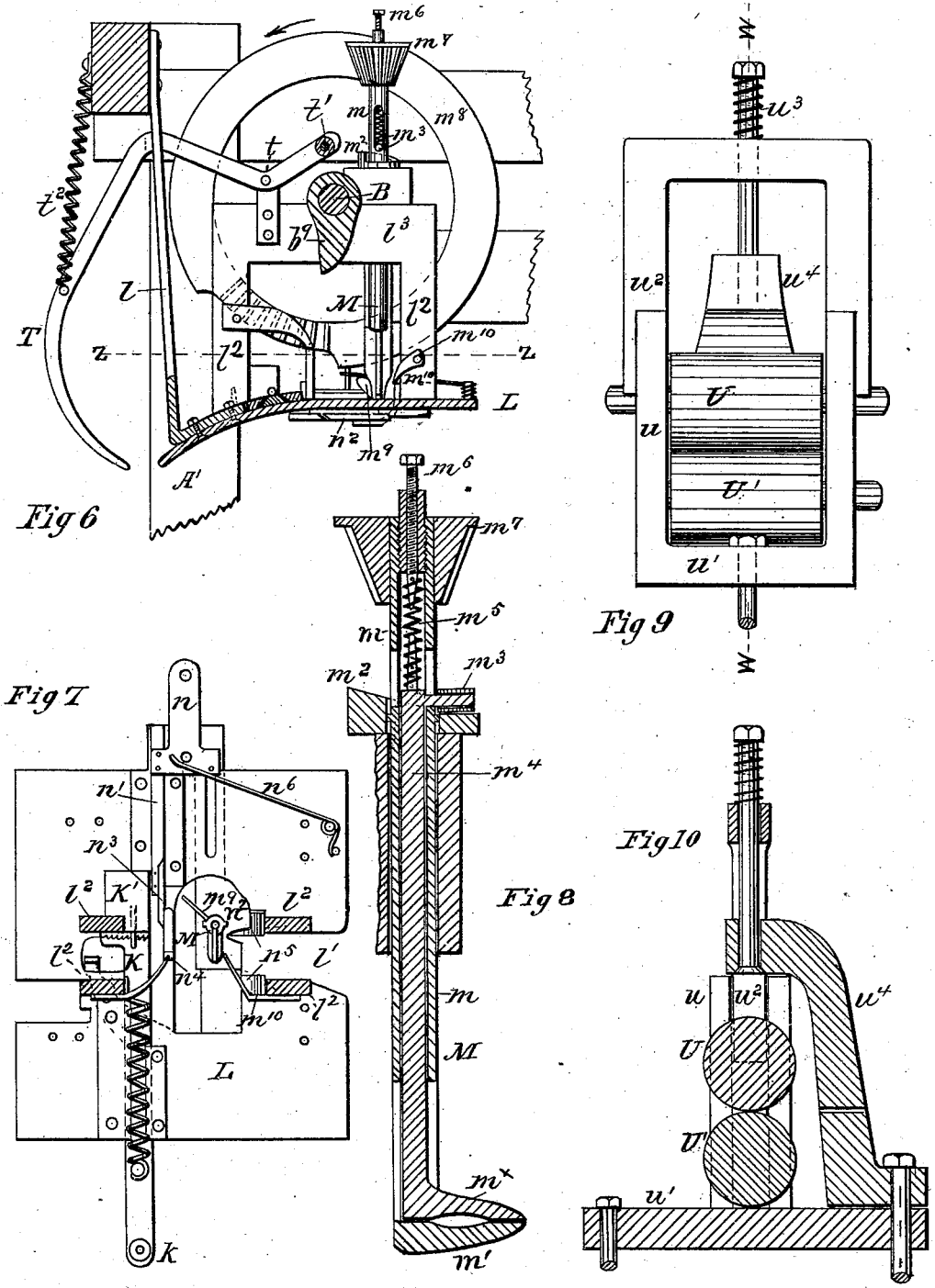

UNITED STATES PATENT OFFICE.

GEORGE B. MORTON, OF CHICAGO, ILLINOIS, ASSIGNOR OF ONE-THIRD TO THOMAS H. ARNOLD, OF MEMPHIS, AND SAID MORTON AND ARNOLD ASSIGNORS OF ONE-FOURTH TO S. C. DE PASS, OF MEMPHIS, TENN.

GRAIN-BINDER.

SPECIFICATION forming part of Letters Patent No. 256,357, dated April 11, 1882.

Application filed July 25, 1881. (Model.)

*To all whom it may concern:*

Be it known that I, GEORGE B. MORTON, of the city of Chicago, county of Cook, and State of Illinois, have invented certain new and useful Improvements in Grain-Binders, which are fully set forth in the following specification, reference being had to the accompanying drawings, in which—

Figure 1:
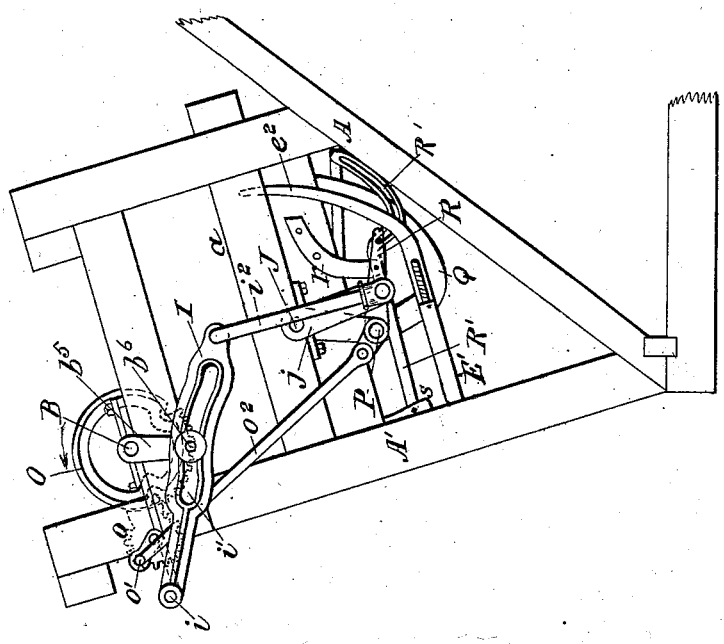
Figure 2:
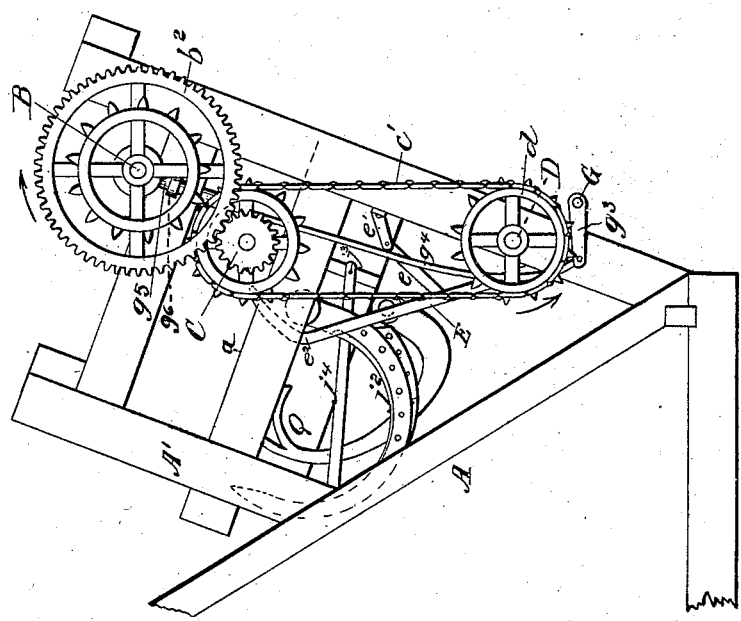
Figure 3:
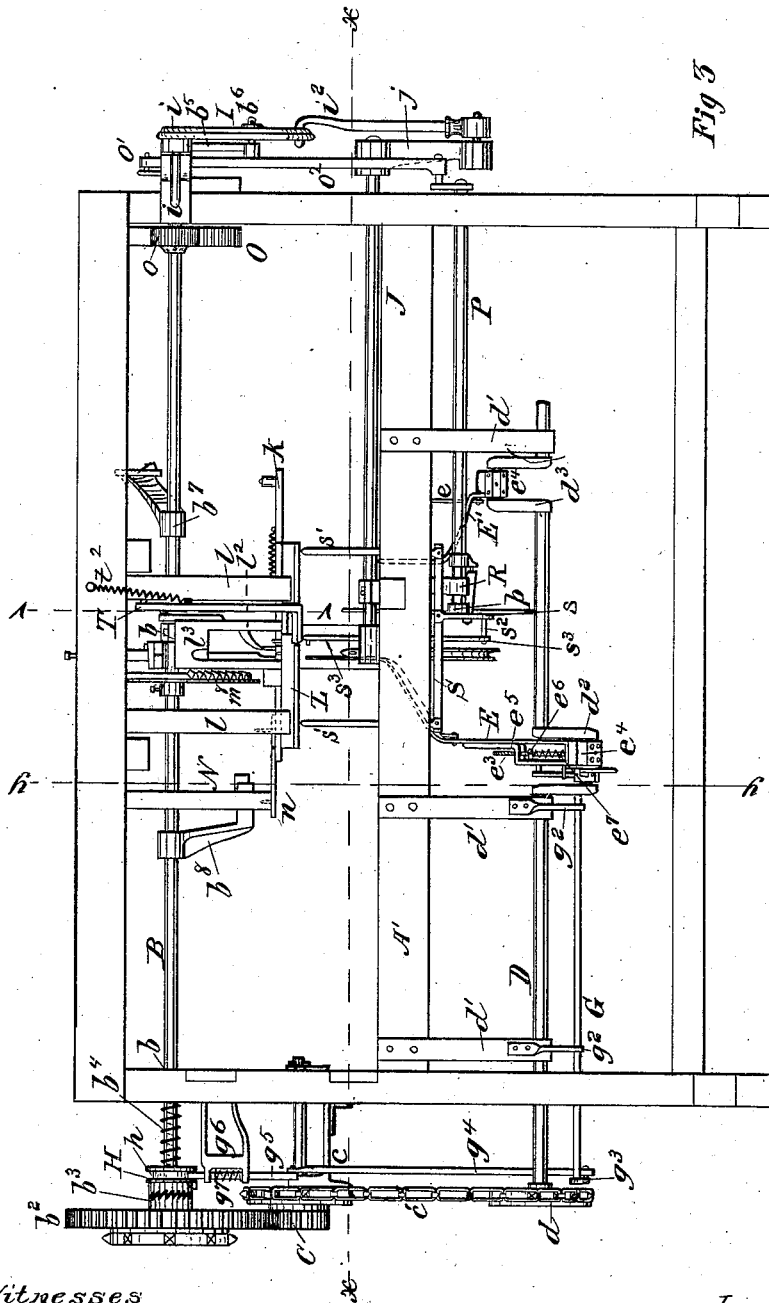
Figure 11:
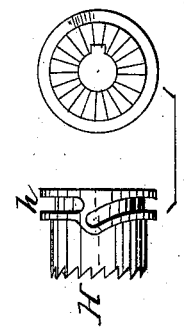
Figure 5:
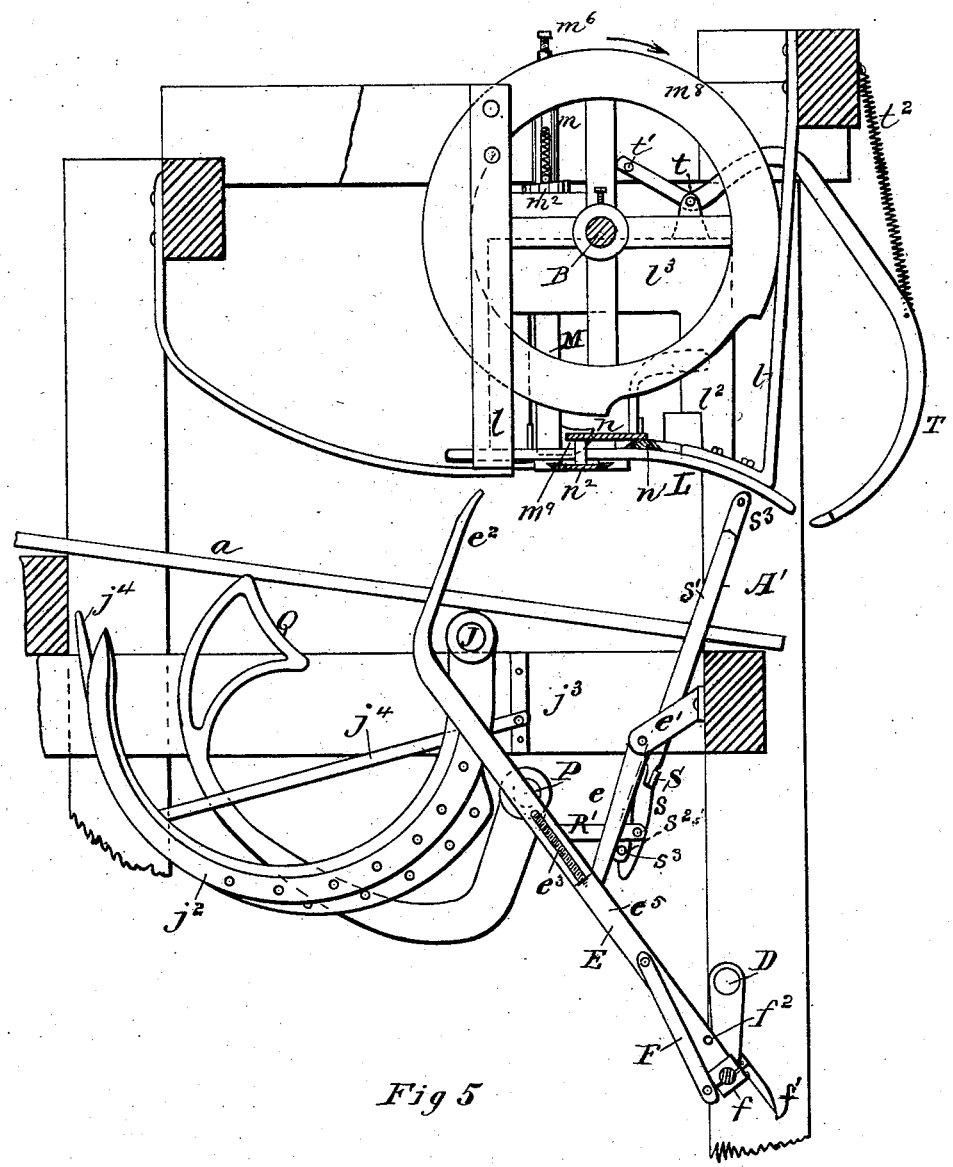

Figure 1 is a front end elevation of a grain-binder embodying my improvements; Fig. 2, a rear end elevation of the same; Fig. 3, a side elevation of the same; Fig. 4, a plan section of part of same on an enlarged scale, taken on the line $x\ x$, Fig. 3; Fig. 5, a cross-section on line $y\ y$, Fig. 3; Fig. 6, a detail view of the knotting device, taken on the line $v\ v$, Fig. 3; Fig. 7, a plan section of the same, taken on the line $z\ z$, Fig. 6; Fig. 8, a vertical longitudinal section of the knotting-hook and shaft on a scale still more enlarged; Fig. 9, a front elevation of the cord-tension device on a scale nearly full size; Fig. 10, a longitudinal section of the same, taken on the line $w\ w$, Fig. 9; and Fig. 11, a detail view of the clutch-sleeve.

My invention relates to that class of grain-binders which is adapted for use in connection with a harvester, and in which string is used for the binding material; and the invention consists in certain mechanism and combinations of devices, all of which will be hereinafter fully described, and the special improvements which are believed to be new, and which I desire to secure by Letters Patent, will then be pointed out definitely in the claims.

As my improvements relate wholly to the binding apparatus, I have not shown the other parts of the harvester, except a portion of the elevator-frame, which is represented by A in the drawings. It will be understood, however, that my binder may be applied to any harvester, the grain being delivered to a receiver, $a$, in the usual way. There is a supporting-frame, A', in which the binding mechanism is mounted, and which is connected to and supported by the main and elevator frames of the machine.

B is the main shaft of the binder, supported in the frame A' at each of its ends and midway by suitable bearings, $b$. On the rear end of this shaft B is mounted loosely the combined spur and sprocket wheel $b^2$, driven by a chain operated by a sprocket-wheel on the harvester in the usual manner. The cogs of this wheel $b^2$ mesh into those of the combined spur and sprocket wheel C, the shaft of which has bearings in a bracket, $c$, on the frame A'. The spockets of the wheel C operate by means of a chain, $c'$, the sprocket-wheel $d$, which is keyed to and operates the crank-shaft D, having bearings in brackets $d'$, depending from the frame A'.

The shaft D is provided with cranks $d^2$ and $d^3$, projecting therefrom in opposite directions, which give alternate movements to the packers E and E', each of the latter being pivoted about midway to a link, $e$, which itself is pivoted to a bracket, $e'$, the lower ends of the packers being connected to the respective cranks.

The packers are composed of two parts, the arm $e^2$ and the sliding pin $e^3$, terminating in a journal-box, $e^4$. This pin $e^3$ has close-fitting guides in the bracket $e^5$ on the arm $e^2$. The outer end of the pin $e^3$ is threaded for the reception of a nut, $e^6$, between which and the inner bracket, $e^5$, the spring $e^7$ is inserted around the pin $e^3$. In this instance the bracket is made in one piece with the arm; but it may be made separate and attached thereto. One end of a connecting-rod, F, is pivoted to the packer E and the other end rocks a short lever, $f$, having the crank $e^2$ for its fulcrum, and carrying at its outer end the rigidly-attached tripping-finger $f'$.

The arm $e^2$ is provided with a stop-pin, $f^2$, to prevent the yielding of the finger $f'$ when it engages with the trip-crank $g'$. The suspension of the packers on the cranks and pivoted links gives a peculiar movement to them by the revolution of the cranks, which may be called a "three-motion" movement, as applied to the upper or packing ends of the arms. This movement may be described as first upward, then outward, and then downward and backward; but always on curved lines. The ends of the packers are carried up through slots in the receiver behind the grain, which they pull forward to form the gavel against a rack, which will be hereinafter described. When the packers E E' have formed a gavel of the desired size the arms $e^2$ are held in check by the accumulated grain, which overcomes the opposing elasticity of the springs $e^3$, the latter being compressed. As the crank $d^2$ continues to revolve, it will move away from the arm $e^2$, and the lever $f$ will be drawn up by the connecting-rod F until the latter strikes the pin $f^2$, and the tripping finger $f'$ is thrown backward, so that as the crank $d^2$ draws the packer E down upon the gavel the tripping-finger $f'$ is moved backward sufficiently to strike and depress the crank $g'$, which rocks a shaft, G, provided with a returning-spring, $g$. This shaft has bearings in brackets $g^2$, secured to the brackets $d'$, and on its outer end is keyed a crank-arm, $g^3$, to which is pivoted the pitman $g^4$, connected at its other end to the sliding pin $g^5$, provided with close-fitting guides in the bracket $g^6$ on the frame.

Between the upper and lower guides in the bracket $g^6$ is situated a spring, $g^7$, its upper end secured to and the whole of it surrounding the pin $g^5$. When the pin $g^5$ is lowered by means of the tripping-finger $f'$ the sliding clutch-sleeve H, in the groove $h$ of which the pin $g^5$ usually travels, is free to engage with its counterpart $b^3$, securely attached to the wheel $b^2$. This engagement is caused by the force of the spring $b^4$ behind the clutch. The groove $h$ encircles the sleeve H, but its ends are in different planes and disconnected—that is to say, one end of said groove takes a spiral direction in the sleeve, so that at this point the pin in the groove will slide the sleeve backward at the end of each revolution to disengage the clutch, and whenever the clutch-sleeve H is released by the finger $f'$, the pin $g^5$, after the tripping operation, drops into the other straight end of the groove. The bend at the end of the groove is sharp, and being terminated positively, the pin acts with certainty, and there is no slipping. When the clutch-sleeve H engages with its counterpart the shaft B will be rotated, and with it the crank $b^5$ at its front end. This crank $b^5$ oscillates the slotted lever I, which is pivoted at $i$ to a bracket on the frame A' by means of the crank-pin $b^6$, which rides in the slot $i'$ in the lever. The vibrating end of this lever I carries a connecting-rod, $i^2$, which rocks a shaft, J, through a crank, $j$, thereon. This shaft J has suitable bearings on the frame A', and at its inner end carries the binding-arm $j^2$, which in the position of rest lies below the receiver. When the trip is operated by the completion of the gavel and the shaft B commences to rotate, as described above, the binding-arm is brought up through the receiver $a$ and down over the gavel, carrying with it the cord, the end of which is held between the gripping-jaws K K', supported in the bed-plate L of the knotter-frame, which plate L is secured to the frame A' by brackets $l$. The plate L is cut away centrally to accommodate the movements of the knotting-hook, and at the outer edge of the plate a slot, $l'$, is cut through into the central opening, the slot being widened gradually outward. An upright supporting-frame, substantially rectangular, is cast with the plate L, or rigidly secured thereto, being composed of four standards, $l^2$, and a horizontal plate, $l^3$. This frame supports the knotting-hook M, the hollow shaft $m$ of which is arranged vertically above the plate L, and is mounted in a suitable journal-box supported on the frame.

The hollow shaft $m$ terminates at its lower end in a jaw, $m'$, which constitutes the fixed member of the knotting-hook, and on the same side of the shaft a slot is cut for some distance upward to permit the sliding movement of the other member of the hook $m^x$. This shaft $m$ has collars secured to it immediately above and below its journal-box, which prevent longitudinal play.

Surrounding the upper collar, and secured to the box, is a ring-cam, $m^2$, on which rides a roller on a pin, $m^3$, extending through a slot in the shaft $m$ from an inner and shorter shaft, $m^4$, to which it is secured, and which is closely sheathed in the shaft $m$. The lower end of shaft $m^4$ terminates in the upper or movable jaw, $m^x$, of the knotting-hook, the upper end of said shaft being reduced in diameter near to and above the pin $m^3$, so as to form a shoulder, on which a spring, $m^5$, rests, said spring being incased in the upper part of the shaft $m$ and compressed by an adjusting-screw, $m^6$.

On the upper end of the shaft $m$ is keyed a bevel stop-pinion, $m^7$, meshing with a corresponding mutilated bevel-wheel, $m^8$, keyed to the shaft B. The shaft $m$ has at its lower end a projection, $m^9$, the under side of which is beveled, so as to prevent the incipient loop from catching on the hinder part of the hook during the operation of knotting. A guide, $m^{10}$, directs the cord to the hook on the vibration of the binding-arm, and the latter sufficiently compresses the grain to permit the cord between the knotting-hook and bundle to be so nearly vertical that the hook in rotating will be sure to pass over and take the cord to form a perfect loop. While the loop is being formed the ring-cam $m^2$ begins to elevate the upper jaw, $m^x$, of the knotting-hook, so that on approaching the portion of the cords held by the gripping-jaws K K' said upper jaw passes over these cords preparatory to closing upon the lower jaw and confining them within the hook. When this is accomplished the cam-face of the end of an arm, $b^7$, on the shaft B strikes a roller on the outer end of a spring-slide, $k$, which is arranged to slide in suitable ways in the plate L, and terminates in the gripping-jaw K. At one side of the jaw K is a lug, which rises above the same, to prevent it from withdrawing that part of the cord which lies taut between the knotter and the eye of the needle-arm, and to allow this part of the cord to fall into range of the jaw K when it closes. This jaw K, on springing back, catches the cord below the binding-arm just between the point at which it will be cut and the eye of the arm. After the new grip is made an arm, $b^8$, keyed to the shaft B, and provided at its extremity with two alternating and opposing cam-faces, pushes with its inner face a pin on a swinging lever, N, having its fulcrum on the frame A', and pivoted at its working end to the slide $n$. This slide has two branches, $n'$ and $n^2$, arranged to travel in suitable ways on the plate L. The branch $n'$ carries a knife, $n^3$, which cuts the cord as it lies taut between the gripping-jaws and the knotting-hook and against a fender, $n^4$, which fender also serves as a guide to enable the binding-arm to lay the cord over the hook. The other branch, $n^2$, terminates in a fork or stripper, $n^5$, and is of such length that the stripper, just after the cords are cut, sheds the loop from the knotting-hook and draws it over the cord ends which leave the hook last. After the knife and stripper have done their work the outer and opposing cam-face of the arm $b^8$ engages the pin on the lever N and draws back the latter, with the slide $n$, to its normal position, where it is locked against accidental jarring by the spring-arm $n^6$.

I will now describe a few remaining auxiliary appliances.

Near the front end of the shaft B is keyed thereon a stop spur-wheel, O, which engages with a corresponding pinion, $o$, keyed to a short shaft having a broad bearing in the frame A', and carrying at its outer end, beyond said bearing, a crank, $o'$, to which is pivoted a connecting-rod, $o^2$, which rocks a shaft, P, having its outer bearing on the frame A' and its inner one in a bracket, $p$, depending from said frame.

At the inner end of the shaft P is keyed the discharging-arm Q. On the outer side of the bracket $p$ is keyed on the shaft P a crank-arm, R, the crank-pin of which works in the slot of a slotted lever, R', having its fulcrum on a bracket, $r$, and pivoted at its working end to an arm, $s$, depending from and forming part of a rack-bar, S, the arms $s'$ of which rest on the frame A'.

On the outer end of the lever R' is a pin, $s^2$, on which is pivoted the compressor-arm $s^3$, which is provided with a pin or shoulder at its upper end, which prevents its depression below its guiding-slot, $s^4$, which is in a bracket projecting from the frame A'. Against this arm $s^3$ the compressing-lever T, which is pivoted at $t$ on a standard rising from the plate $l^3$, strikes when the roller $t'$ on its other end is operated upon by a cam, $b^9$, keyed to the shaft B. When not thus in use the lever T is held out of the way by the spring $t^2$.

The arm $s^3$ is operated by the lever T for the purpose of compressing the bundle during the knotting, while a part of its binding-cord is required to furnish slack for the knotting operation.

On a pin, $j^3$, secured to the frame A' is pivoted a cut-off arm, $j^4$, the upright end of which is held above the receiver $a$ by a spring, $j^5$. After a bundle is bound and ready to be discharged the binding-arm recedes below the receiver $a$, and a pin, $j^6$, inserted in the side of the arm, strikes the arm $j^4$ and causes that to recede also, both it and the binding-arm remaining below the receiver $a$ until sufficient grain has been packed to form a new bundle.

The tension device (shown in detail in Figs. 9 and 10) consists of a pair of parallel rollers, U U', mounted in slides $u$ in a suitable frame, $u'$, and pressed together upon the cord by bearings in a yoke or pressing-frame, $u^2$, held down by a spring, $u^3$, compressed between the top of said frame $u^2$ and an adjusting-nut on a standard, $u^4$, which rises from the frame $u'$.

The operation of my machine is as follows: The supply of cord is held in a suitable receptacle conveniently arranged on the machine, and when it is desired to put the machine into use the leading end of the cord is carried out to the tension-rollers, between which it is passed and carried thence to the binding-arm, where it is threaded through an eye near the point of the arm, and is carried thence upward over the knotting-hook to the gripping-jaws, into which it is placed either at once by the hand, or it may be held in suitable position and the machine put through one revolution of the main shaft, when it will be caught in the holding-jaws, and the machine is ready for operation.

The tension device is located at any convenient point, and, if necessary, loops or eyes are placed between it and the binding-arm to bring the cord into proper position.

Grain is delivered upon the receiver $a$ in the ordinary way, and is packed by the packers E E' against the rack S' and the cord, as it extends from the gripping-jaws to the eye of the now-depressed needle-arm. When a quantity sufficient to form a bundle has been packed the packer-arm $e^2$ trips the pin $g^5$ by means of the finger $f'$, thus permitting the engagement of the wheel $b^2$ with the clutch-sleeve H on the shaft B, and thereby starting the main shaft, which brings the binding-arm up over the gavel by means of the above-described intermediate mechanism. At the outward limit of its vibration the binding-arm pauses during the tying of the knot and the gripping of the cord by the jaws K K'. This stopping of the arm is permitted by the coincidence and concentricity of the curved part of the slot $i'$ with the arc through which the crank-pin $b^6$ travels. The closing of the binding-arm lays another strand of cord over the knotting-hook, and as soon as the arm is closed the mechanism for rotating the hook begins to operate. As the hook is revolved a loop is formed in the usual way around its bill, and at the same time the jaws are opened by the operation of the cam during the latter half of the revolution to take the strands of the cord between them, and at the end of the revolution the jaws close on these strands. At the closing of the binding-arm the compressor is also brought into operation to give an extra compression to the bundle during the formation of the loop. The stripper now sheds the loop from the hook, the compressor being released at the moment the hook stops. The gripping-jaws release the cord just before it is cut and seize the supply end of the cord. The movement of the cutter begins just as the cord is again seized by the holder and simultaneously with the movement of the stripper. The stripper and cutter are relatively arranged on the reciprocating carrier in such a manner that the cord is severed just before the loop is finally shed. As soon as the crank-pin $b^6$ has passed the curve of the slot $i'$ and the arm begins to be withdrawn the wheel O meshes with the pinion $o$, which, through the shaft P, crank-arm R, and lever R', depresses the rack S' and compressor-arm $s^3$ in time to permit the free discharge of the bundle, which the discharging-arm reaches and throws off after completing a part of its outward vibration, and after the binding-arm has receded from before the bundle. At the completion of the revolution of the main shaft the clutch-sleeve is thrown out of engagement with the driving-wheel by the bend in its groove in which the tripping-pin works, as above described, thereby stopping the binding mechanism, which now stands at rest until another bundle is formed, when the operation is repeated.

Having thus described my invention, what I claim as new, and desire to secure by Letters Patent, is—

1. In a grain-binder, a gathering and packing arm or arms constructed and arranged to yield bodily as the bundle is gathered and formed, substantially as described.

2. In a grain-binder, a yielding packer or packers, in combination with an adjustable tension device, whereby the size of the bundles may be regulated, substantially as described.

3. In a grain-binder, a packer or packers, constructed and arranged to yield lengthwise, in combination with a tripping mechanism, whereby the binder is thrown into operation by the yielding of the packers, substantially as described.

4. In a grain-binder, the yielding, gathering, and packing arms E E', in combination with the cranks to which they are attached at one end, and pivoted swinging links connected to the said arms between the cranks and the packing-ends, whereby a three-motion curvilinear movement is given to the said packing-ends, substantially as described.

5. The packer-arm, in combination with a pin or guide-bar to which the packer-arm is loosely connected at its inner end, the crank-arm to which the pin is pivoted, and the spring between the pin and packer, whereby the latter is permitted to yield lengthwise on the former, substantially as described.

6. The packer E, in combination with the pin $e^3$, connected to the crank $d^2$, spring $e^7$, connecting-rod F, rocking-lever $f$, and tripping-finger $f'$, arranged to operate the trip-crank as the lever is rocked by the yielding of the packer, substantially as described.

7. The yielding packer, in combination with the connecting-rod F, rocking lever $f$, provided with trip-finger $f'$, trip-crank $g'$, on the rock-shaft G, pitman $g^4$, spring-pin $g^5$, and spring-clutch H, substantially as described.

8. A compressor-arm supported upon a slotted lever beneath the grain-receiver, in combination with a crank concentric with and operated by the shaft of the discharging-arm, whereby the compressor is withdrawn simultaneously with the movement of the bundle-discharger, substantially as described.

9. The compressor-arm, in combination with a vibrating lever, T, and a cam on the main shaft arranged to vibrate the lever when the shaft is revolved, substantially as and for the purpose set forth.

10. The yielding packers, in combination with the arms $s'$ and the vibrating compressor-arm, substantially as described.

11. The tubular shaft $m$, carrying at its lower end one member of the knotting-hook, in combination with the shaft $m^4$, carrying the upper member of the tying-hook and provided with a pin, $m^3$, the cam $m^2$, the spring $m^5$, and the adjusting-screw $m^6$, substantially as described.

12. The tubular shaft $m$, carrying at its lower end one member of the knotting-hook, in combination with the shaft $m^4$, carrying the other member of said hook and provided with a pin, $m^3$, the cam $m^2$, the spring $m^5$, the adjusting-screw $m^6$, and the stripper, substantially as described.

13. The tubular shaft $m$, carrying at its lower end one member of the knotting-hook, in combination with the shaft $m^4$, carrying the other member of said hook and provided with the pin $m^3$, the cam $m^2$, the spring $m^5$, the adjusting-screw $m^6$, the stripper $n^5$, and the cutter $n^3$, substantially as described.

GEORGE B. MORTON.

Witnesses:
GEO. R. CUTLER,
J. M. THACHER.